United States Patent [19]

Wiley

[11] Patent Number: 4,693,560
[45] Date of Patent: Sep. 15, 1987

[54] DOUBLE LAYER DISPLAY

[75] Inventor: Richard Wiley, Los Altos, Calif.

[73] Assignee: Taliq Corporation, Sunnyvale, Calif.

[21] Appl. No.: 911,980

[22] Filed: Sep. 25, 1986

[51] Int. Cl.$^4$ .................................................. G02F 1/13
[52] U.S. Cl. .............................. 350/335; 350/347 V; 350/347 E; 350/345
[58] Field of Search ................... 350/335, 345, 347 V, 350/347 E

[56] References Cited

U.S. PATENT DOCUMENTS

| | | | |
|---|---|---|---|
| 4,294,518 | 10/1981 | O'Connor et al. | 350/335 X |
| 4,364,039 | 12/1982 | Penz | 350/335 X |
| 4,405,210 | 9/1983 | Baur et al. | 350/345 |
| 4,435,047 | 3/1984 | Fergason | 350/334 |
| 4,470,666 | 9/1984 | Eick | 350/345 |
| 4,556,289 | 12/1985 | Fergason | 350/350 |
| 4,579,423 | 4/1986 | Fergason | 350/349 X |
| 4,596,445 | 6/1986 | Fergason | 350/339 |
| 4,637,687 | 1/1987 | Haim et al. | 350/349 X |

OTHER PUBLICATIONS

Seki, et al., "Evaluation of Brightness and Contrast of Twisted Nematic and Guest-Host Cells, Japan Display, 1983.

Primary Examiner—John K. Corbin
Assistant Examiner—Richard F. Gallivan
Attorney, Agent, or Firm—Flehr, Hohbach, Test, Albritton & Herbert

[57] ABSTRACT

A display apparatus comprising a first liquid crystal means and a second liquid crystal means spaced from the first liquid crystal means. Means are disposed between the first and second liquid crystal means for transmitting and reflecting incident light. The first and second liquid crystal means comprise liquid crystal material containing a dye that conforms to the structure of the liquid crystal material and a containment medium for inducing distorted alignment of the liquid crystal material which in response to such alignment scatters and absorbs light and which response to a prescribed input reduces the amount of such scattering and absorption.

20 Claims, 4 Drawing Figures

U.S. Patent    Sep. 15, 1987    4,693,560
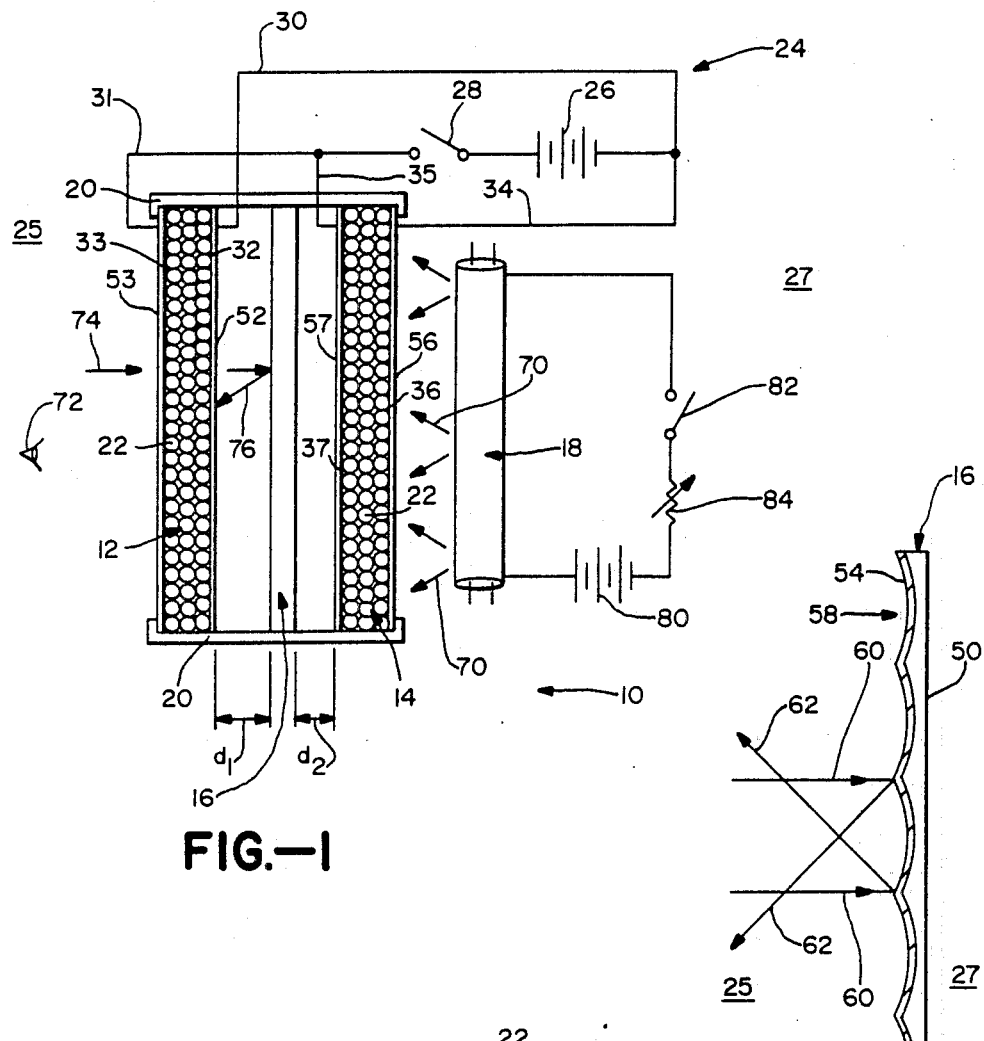
FIG.—1
FIG.—2
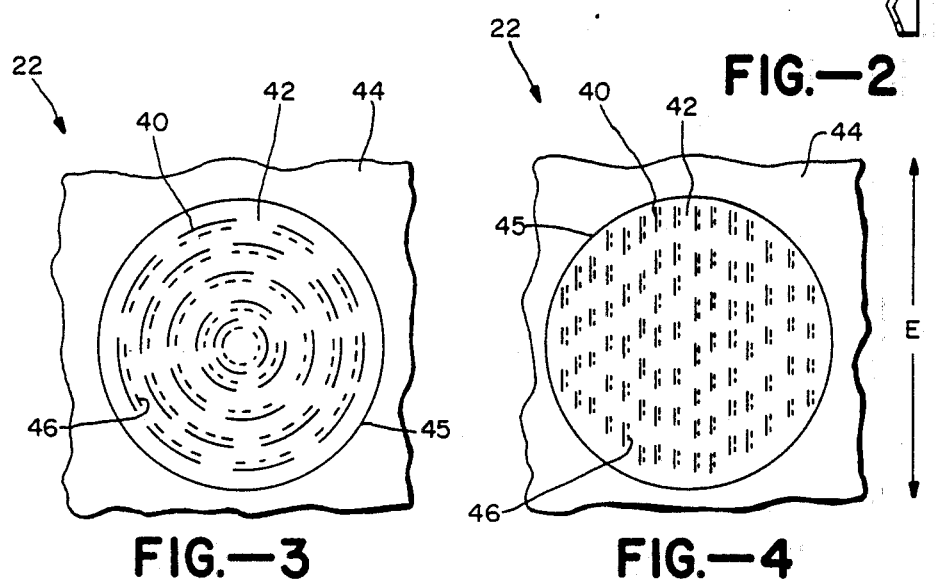
FIG.—3
FIG.—4

DOUBLE LAYER DISPLAY

BACKGROUND OF THE INVENTION

The present invention relates generally to displays, and more particularly to liquid crystal displays.

Visual display devices may utilize liquid crystals. The property of liquid crystals that enables them to be used in visual displays is the ability of liquid crystals to transmit light in a strictly aligned or field-on state, and to scatter light and/or to absorb it especially when combined with an appropriate dye, in a relatively free or field-off state. An electric field may be selectively applied across the liquid crystals to switch between field-off and field-on states.

It is desirable that liquid crystal visual displays have excellent contrast between the characters displayed and the background and high brightness in all ambient light conditions. It is also desirable that the display be free of front surface glare.

There are three categories of liquid crystal materials, namely, cholesteric, nematic and smectic. The present invention relates in a preferred embodiment described hereinafter to the use of a liquid crystal that is nematic or operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. patent application Ser. No. 477,242, filed Mar. 21, 1983, now U.S. Pat. No. 4,616,903, in the name of Fergason, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, in the name of Fergason, entitled ENCAPSULATED LIQUID CRYSTAL AND METHOD, assigned to Manchester R&D Partnership, which disclosure is also hereby incorporated by reference.

The operationally nematic liquid crystal is contained in a containment medium that forms volumes of liquid crystal material. In the field-off condition, or any other condition which results in the liquid crystal being in a distorted or randomly aligned state, the liquid crystal structure is distorted to a curved form (hence curvilinearly aligned) wherein the spatial average orientation of the liquid crystal over a capsule-like volume, for instance, is strongly curved and there is no substantial parallel directional orientation of the liquid crystal in the absence of a prescribed input.

Preferably, the operationally nematic liquid crystal has a positive dielectric anisotropy, and has an ordinary index of refraction that substantially matches that of the containment medium. Such material will cause scattering of light incident thereon in the field-off or relatively free state. This liquid crystal material, described in detail in the above-identified U.S. Pat. No. 4,435,047, may be designated encapsulated operationally nematic liquid crystal material or nematic curvilinearly aligned phases ("NCAP") liquid crystal material.

The present invention, however, is not necessarily limited to NCAP configured liquid crystal. Certain embodiments of the invention may be employed with any of the various types of liquid crystal materials or configurations thereof that selectively scatter and/or absorb or transmit light in response to a prescribed input.

Usually liquid crystal is anisotropic both optically and, for example in the case of nematic liquid crystal, electrically. The optical anisotropy is manifest by the scattering of light when the liquid crystal is in random alignment, and the transmission of light through the liquid crystal when it is in ordered alignment.

A pleochroic dye may be present with the liquid crystal material to provide substantial attenuation by absorption in the field-of state but to be substantially transparent in the field-on state.

Any reference to the ability of liquid crystal to scatter and/or absorb light in accordance with the present invention should not be limited to the scattering and minimal absorption properties of liquid crystal but should include the additional properties pleochroic dyes may impose on the optical properties of the liquid crystal.

The present invention relates to improvements in displays as well as to the utilization of the light scattering and absorption characteristics of liquid crystal materials in displays. The invention also relates to the use of such materials and characteristics, together with a pleochroic or diochroic dye, for example, to obtain relatively dark characters or information displayed on a relatively bright background in both small and large size displays.

An object of the present invention is to provide a display having a relatively high quality of optical brightness and contrast.

A further object of the present invention is to provide a liquid crystal display that has excellent contrast and high brightness in all ambient light conditions.

Another object of the present invention is to improve the performance of a liquid crystal display in viewing conditions where glare is present.

SUMMARY OF THE INVENTION

As may be seen hereinafter, the display apparatus disclosed herein is one which comprises a first liquid crystal means and a second liquid crystal means spaced from the first liquid crystal means. A means for transmitting and reflecting light is disposed between the first and second liquid crystal means.

The first and second liquid crystal means comprise a liquid crystal material containing a dye that conforms to the structure of the liquid crystal material and a containment medium means. The containment medium means induces a distorted alignment of the liquid crystal material which in response to such alignment scatters and absorbs light and which in response to a prescribed input induces the amount of such scattering and absorption.

The display may further include a source of backlight. The backlight source is disposed at the non-viewing side of the display.

In accordance with one aspect of the present invention, a liquid crystal display, such as an automotive dash board, can produce relatively bright or white characters, information, etc. on a relatively dark background.

The dark background may be produced by liquid crystal material that is randomly aligned in the field-off state wherein light incident on the liquid crystal material is scattered and absorbed. The bright characters are caused, for example, by liquid crystal material that is in a field-on state or in ordered alignment and thus, substantially optically transparent. When the liquid crystal material is in the field-off state, only the relatively dark background appears. When a selected portion of the liquid crystal material is in order alignment—field-on state—a very bright character will appear against the dark background to an observer within a viewing angle of the display. The foregoing may be accomplished using relatively low-power requirements and minimum liquid crystal material.

DESCRIPTION OF THE DRAWING FIGURES

The display of the present invention will be described in more detail hereinafter in conjunction with the drawings wherein:

FIG. 1 is a schematic, side elevational view illustrating a display apparatus in accordance with the present invention;

FIG. 2 is a schematic view illustrating the transflector component of the display apparatus of the present invention; and FIGS. 3 and 4 are schematic illustrations of a liquid crystal material used in the invention including a volume of liquid crystal with a dye in a containment medium means with the liquid crystal structure in distorted and parallel alignment, respectively.

DETAILED DESCRIPTION OF THE PREFERRED EMBODIMENTS

Referring now to the drawings, wherein like reference numerals for like components are utilized throughout the drawings, attention is first directed to FIG. 1. FIG. 1 shows a liquid crystal display apparatus indicated generally by reference numeral 10.

The display 10 includes four main components. These components are: liquid crystal cells 12 and 14, a transflector 16, and a backlight source 18. Liquid crystal cell 12 is at a viewing side 25 of display 10. The backlight 18 is at a non-viewing side 27. The transflector 16 is located in the space between cell 12 and cell 14.

The display may further include a frame 20. The frame may comprise a plastic housing that provides environmental protection for the liquid crystal cells and the transflector.

The liquid crystal cells include a liquid crystal material 22. The optical characteristics of the liquid crystal material according to the invention are a function of whether or not a prescribed input is applied to the liquid crystal material; and in particular, the optical absorption characteristics are a function of the magnitude of the prescribed input. The prescribed input is preferably of the electromagnetic type and, more particularly, an electric field.

A schematic representation of a circuit 24 for selectively applying or not an electric field to the liquid crystal material 22 is illustrated in FIG. 1. Such circuit 24 includes an electric power supply 26, such as a battery, and a switch 28. The electric power supply may alternatively be a source of alternating current. The circuit 24 is connected by electrical leads 30, 31 to electrodes 32, 33 positioned on opposite sides or surfaces of liquid crystal material 22 of cell 12, and by electrical leads 34, 35 to electrodes 36, 37 on opposite sides of the liquid crystal material of cell 14.

The electrodes 32, 33 are substantially optically-transparent, and may be formed on optically-transparent substrates 52, 53, respectively. Electrodes 36, 37 may be of the same construction, and may be formed on optically-transparent substrates 56, 57.

Operationally, with switch 28 open, no electric field is applied to the liquid crystal material, which then is in the so-called field-off or de-energized condition or mode. With switch 28 closed, an electric field is applied across the liquid crystal material, which then goes into the so-called field-on condition or mode. The operational characteristics of the display will depend on the field-on or field-off condition of the liquid crystal material 22, as is described in further detail below.

The liquid crystal material 22 preferably is of the type (NCAP) disclosed in U.S. Pat. No. 4,435,074. In particular, as is represented schematically in FIG. 3, such liquid crystal material 22 preferably is formed of operationally nematic liquid crystal 40 in a plurality of volumes 42 formed in or defined by a containment medium 44. The liquid crystal 40 preferably is optically transparent, and the containment medium preferably also is optically transparent. In the embodiment illustrated, preferably the liquid crystal material 22 has mixed therewith a dye 46, for example a pleochroic or diochroic dye. The containment medium 44 has an index of refraction and the liquid crystal material is birefringent, being optically anisotropic and having positive dielectric anisotropy during operation.

Each volume 42 may be discrete or alternatively the liquid crystal 40 may be contained in a containment medium, such as a latex medium as will be hereinafter discussed, that tends to form a multitude of capsule-like environments containing the liquid crystal material. In this regard, the liquid crystal 40 may be more or less confined to an approximately spherical or otherwise curvilinear surface of a containment cavity. Such cavities, however, may be interconnected, for example, by one or more channels or passages. The liquid crystal would preferably be in both the discrete volumes or cavities and in the interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

Preferably, the liquid crystal is nematic liquid crystal having positive dielectric anisotropy. Nematic liquid crystal has fluid-like properties that facilitate the conformance or the distortion thereof to the shape of the capsule wall in the absence of an electric field. On the other hand, in the presence of an electric field such nematic material will relatively easily change to ordered alignment with respect to such field.

The pleochroic dye 46 in the liquid crystal 40 will absorb some of the light transmitted therethrough, and the degree of such absorption is a function of whether or not an electric field is applied to the liquid crystal material and of the magnitude of such field. Preferably such absorption in the field-on condition of the liquid crystal should be zero or as close to zero as possible to maximize transmission of incident light.

The dye alignment follows the alignment of the liquid crystal 40, as is illustrated schematically in FIGS. 3 and 4, for example, and is explained in further detail in the above-mentioned patent. Therefore, when the liquid crystal structure is in distorted alignment, the dye will provide a relatively substantial amount of light absorption. However, when the liquid crystal 40 is in parallel alignment, e.g., like that liquid crystal shown in FIG. 4, light absorption by the dye will be minimized. As the magnitude of electric field is increased or decreased, the amount of distortion of the liquid crystal material will vary, and the amount of absorption by the dye also will correspondingly vary.

In field-on operation, as shown in FIG. 4, the liquid crystal structure is considered to assume a generally parallel alignment. Since the ordinary index of refraction of the liquid crystal 40 in field-on condition is matched to that of the containment medium 44, the liquid crystal material 22 becomes essentially optically transparent and light incident thereon is not refracted at interfaces between the liquid crystal and containment medium. During such field-on operation, incident light is transmitted through the liquid crystal cells.

Field-off operation of the display is depicted in FIG. 3. Light which is incident on the liquid crystal material 22 is refracted, scattered and absorbed. Such scattering is effected because the extraordinary index of refraction of the liquid crystal 40 is different from the index of refraction of the containment medium 44. The light is absorbed by the dye.

The index of refraction ($\Delta N$) of the liquid crystal varies depending on whether an electric field is applied across the liquid crystal material. The index of refraction of containment medium 44 and the ordinary index of refraction (the index when an electric field E is applied) of the liquid crystal 40 should be matched as much as possible when in the field-on state to avoid scattering, thereby tending to maximize light transmission. However, when the liquid crystal is in the field-off state, there will be a difference in the indices of refraction at the boundary of the liquid crystal 40 and the containment medium.

In the field-off state, the containment medium, more specifically, the surface(s) thereof, e.g., the surfaces of the containment medium walls bounding each of the volumes 42 of liquid crystal 40, tend to distort the natural liquid crystal structure to present to a great extent at the interfaces of the liquid crystal and surfaces, the extraordinary index of refraction (the index with no electric field E) characteristic of the liquid crystal; and such extraordinary index of refraction is different from the index of refraction of the containment medium. Therefore, when in such distorted alignment condition, sometimes referred to as NCAP liquid crystal, there is a difference in the indices of refraction at the interface between the liquid crystal and containment medium, which causes refraction and, thus, scattering of light incident thereon. FIG. 3 illustrates such distorted alignment of the liquid crystal structure in the absence of an electric field.

As long as the ordinary index of refraction of the liquid crystal is closer to the index of refraction of the containment medium, than is the extraordinary index of refraction, a change in scattering will result when going from field-on to field-off states, and vice-versa.

Liquid crystal cells 12, 14 both preferably have high perceived contrast ratios. Such contrast ratios may be obtained by increasing the scattering characteristics of the liquid crystal 40 containing dye 46 in the field-off state. The characteristics of the dye also affect the contrast ration. Increased scattering in the off-state can be achieved by increasing the refractive index anisotropy ($\Delta N$) of the liquid crystal, by reducing the size of the liquid crystal volumes in the containment medium, and/or by using a thicker liquid crystal cell. Bulk scattering results from the first technique, surface scattering from the second technique, and a combination of bulk and surface scattering is produced by the third technique.

Preferably, increased scattering is achieved by utilizing a high $\Delta N$, that is a high birefringence, liquid crystal. This technique is superior to the other two since a higher voltage is required for a cell having reduced volumes of liquid crystal and/or an increased thickness. The use of a high $\Delta N$ liquid crystal provides a liquid crystal cell that is highly absorbing and highly scattering in the field-off state.

It is not necessary to identically match the refractive index of the containment medium to the ordinary index of refraction of the liquid crystal, as low to intermediate levels of haze in the field-on state do not significantly affect the light transmission characteristics in that state, and thus do not significantly reduce the contrast ratio. However, maximum contrast results when the ordinary index of refraction of the liquid crystal closely, if not identically, matches the index of refraction of the containment medium.

In accordance with the present invention, electrodes 33, 37 may, for example, form a common electrode surface while the opposed electrodes 32, 36 comprise patterned electrodes having multiple electrode portions that can be selectively energized to apply the electric field to selected portions of the liquid crystal material. For instance, as is well known in the art, electrodes 32, 36 may be divided into seven electrically isolated segments, each of which may be selectively energized to display various numerical characters. Electrodes 32, 36 may also be configured to form a dot matrix display comprising a plurality of dots or pixels arranged in column and rows. A row is enabled to accept display information in parallel via the column lines.

The liquid crystal material 22 may be prepared in the form of an emulsion of liquid crystal and containment medium which is subsequently dried or cured. Alternatively, as noted heretofore, the liquid crystal material may take the form of a plurality of individually formed capsules of liquid crystal in the containment medium.

The liquid crystal may be nematic liquid crystal, and in one embodiment, the containment medium is formed of a polyvinyl alcohol (PVA). In another embodiment, the liquid crystal is dispersed or entrapped in a latex containment medium. In either embodiment, substrates 52, 53 and 56, 57 of liquid crystal cells 12 and 14, respectively, may comprise a polyester film, such as Mylar ®, that has been precoated with a layer of indium tin oxide (ITO) to form the electrodes. Preferably, the film has been precoated with a 90 to 500 ohms per square layer of ITO, and most preferably with a 450±150 ohms per square layer of ITO. Of course, materials other than ITO may be used to form the electrodes of the apparatus of the present invention. A Mylar ® film with a precoated ITO electrode, known as Intrex, may be purchased from Sierracin of Sylmar, Calif. Such an electrode-coated film is flexible.

Latex entrapped NCAP liquid crystal is used in a preferred embodiment. Latex entrapped NCAP liquid crystal comprises the entrapment of liquid crystal in a latex medium. The latex is a suspension of particles. The particles may be natural rubber or synthetic polymers or copolymers. A latex medium is formed by drying a suspension of such particles. A further explanation of latex entrapped NCAP liquid crystal and methods of making the same are provided in U.S. patent application Ser. No. 705,209, filed Feb. 25, 1985, in the name of Pearlman, entitled LATEX ENTRAPPED NCAP LIQUID CRYSTAL COMPOSITION, METHOD AND APPARATUS, assigned to the assignes of the present invention, and which disclosure is hereby incorporated by reference.

Briefly, latex entrapped NCAP liquid crystal may be formed by mixing a suspension of latex particles and liquid crystal wherein the liquid crystal has been previously emulsified in an aqueous phase. Alternatively, all components may be combined prior to emulsifying the liquid crystal. The mixture may then be applied to one of the substrates and electrodes of the liquid crystal cells. As the mixture dries, it adheres to the electrode-coated side of the substrate. When dried, the latex particles form a latex medium with particles of liquid crystal dispersed therein.

A specific method for making latex entrapped NCAP liquid crystal may comprise first emulsifying 68 grams of the liquid crystal D109/E63 (manufactured by BDH Ltd., Poole, England) in a solution containing 103 grams of Neorez R-967 and 0.5 grams of the surfactant Igepol CO620 (available through GAF CORPORATION, N.Y., N.Y.). The liquid crystal is added continuously while the solution is mixed with an impeller blade at 1500 RPM. When the particle size of the liquid crystal is about 1–5 microns, 20 grams of water is added with slow mixing of less than 1000 RPM until the mixture is homogenous. This material may then be cast with a doctor blade or other suitable means onto the substrate and electrode.

The transflector 16 of the display is shown in greater detail in FIG. 2. The transflector provides partial light reflection and partial light transmittance functions, and it also acts as a light filter. It may include an optically transparent, plastic substrate 50 having a part-reflective, part-transmissive coating 54. The ratio of reflective to transmissive surface may vary. The coating may comprise a thin layer of silver or aluminum, for example a sputtered aluminum coating.

As shown in FIG. 2, substrate 50 is patterned to act as a gain reflector. Incident light, represented by light beams 60, is reflected back as light beams 62. In a preferred embodiment, the transflector reflects about 80% of the light incident thereon from viewing side 25, and transmits about 20% of the incident light from non-viewing side 27. In other embodiments of the display, different precentages of light may be transmitted and reflected by the transflector.

The transflector may also be selectively screen printed with fluorescent colored dyes, as shown generally by reference numeral 58. The fluorescent dyes provide a colored pattern that can produce color for pixels in the display. The fluorescent dye increases brightness due to its ability to absorb light over a wide range of frequencies and then to emit this light at a particular color.

The respective spacings "$d_1$" and "$d_2$" between transflector 16 and liquid crystal cells 12 and 14 are approximately equal, and preferably about 1 mm and 1 mm, respectively. However, the spacing may be as great as 250 nm and 250 mm or so close as to actually touch.

The backlight 18 may comprise a source of collimated, fluorescent light, such as one or more fluorescent tubes, that is arranged so that light rays 70 emanating therefrom are directed towards liquid crystal cell 14. The light source is connected in circuit with a battery or other electrical power source 80 and a switch 82 for selective opening and closing to operate the light source. A variable element 84, such as a variable resistor or potentiometer, may be provided to vary the intensity of the backlight.

The backlighting scheme is utilized to overcome front surface glare, and to enhance the appearance of the display when there is little or no ambient light, for example, at night.

The display apparatus of the present invention is operable in all ambient lighting conditions to produce a display having excellent contrast and brightness. The display is effective at night (very low, less than 100 foot lamberts ("Fl"), or zero ambient light), in bright sun (ambient light greater than 1000 Fl), and on cloudy days or indoors (ambient light 100 to 1000 Fl).

At night, display 10 acts as a totally transmissive display. The contrast and brightness of the display are determined by the product of the performance of liquid crystal cells 12 and 14. Thus, the display would have a contrast ratio ("CR") equal to $CR_{12}$ (CR of cell 12)$\times CR_{14}$ (CR of cell 14). The brightness of the display, the light intensity of the "on" pixels, for example, is controlled by the intensity of backlight 18, the product of light transmission (% B) of liquid crystal cell 12 and 14 (% $B_{12} \times$ % $B_{14}$), and the transmission of transflector 16.

In bright sun, display 10 acts as a reflective display, comprising liquid crystal cell 12 and transflector 16. The backlight 18 may be turned off. The contrast ratio and brightness of display 10 are products of the double pass of incident light through liquid crystal cell 12. In the embodiment where the transflector reflects back 80% of incident light, the contrast ratio of display 10 would be $CR_{12}^2$, while the brightness of the display would be % $B_{12}^2 \times 0.8$ (the reflectivity of the transflector).

As discussed, in addition to its normal reflectivity, the transflector may be configured to enhance the brightness of the display by utilizing fluorescent colors and a patterned surface acts as a gain or spreading reflector. A gain reflector is able to provide optical gain over a lambertian reflector in a given viewing angle or cone. The optical gain will show up as an increase in the brightness of display 10 would be equal to % $B_{12}^2 \times 0.8 \times G$ (G is the gain of the reflector where $G > 1$ in the viewing cone). It is possible to get gains of 3 to 6 with an acceptable viewing angle for display 10.

During cloudy days or when indoors, the display acts in a transflective mode (part reflective and part transmissive). The backlight 18 is on in this mode of operation. The contrast of the display would be an averaging of the transmissive contrast and the reflective contrast. The brightness would also be a sum of the reflected and transmitted light.

Thus, at night, light, represented by light beam 70 from light source 18, is transmitted through the two liquid crystal cells, in the field-on condition, and the transflector to effect a display that is observable to a viewer or observing instrument 72 on viewing side 25 within the viewing angle of display 10.

In bright sunlight, incident light, represented by light beam 74, is transmitted through liquid crystal cell 12, in the field-on operation, where it is reflected, shown as light beam 76, by means of the transflector to create a display observable by observer 72.

During cloudy days or when indoors, the display is created by the sum of the reflected light beams 76 and the light beam 70 transmitted through the transflector from the backlight source.

Such light beams for the various modes of operation display the selected numeral, character or other information to an observer 72 on viewing side 25 within the viewing angle of the display. For example, to observer 72, the area between the energized electrodes may appear very light against a very dark background. The liquid crystal material that is not located between the energized electrodes is in the field-off state. Thus, that material still scatters and absorbs incident light, creating a very dark appearance, from both the viewing and non-viewing sides.

The display of the present invention is adaptable to such displays as vehicle dashboards and control panels.

Although certain specific embodiments of the invention have been described herein in detail, the invention is not to be limited only to such embodiments, but rather only by the appended claims.

What is claimed is:

1. A display apparatus comprising:
   a first liquid crystal means;
   a second liquid crystal means spaced from said first liquid crystal means;
   means disposed between said first and second liquid crystal means for both transmitting and reflecting light; and
   said first and second liquid crystal means comprising liquid crystal material containing a dye that conforms to the structure of the liquid material and a containment medium means for inducing a distorted alignment of said liquid crystal material which in response to such alignment scatters and absorbs light and which in response to a prescribed input reduces the amount of such scattering and absorption.

2. The display apparatus of claim 1 further including a source of backlight disposed on a nonviewing side of said second liquid crystal means.

3. The display apparatus of claim 1, said liquid crystal being birefringent and having an ordinary index of refraction in the presence of a prescribed input that is substantially matched to the index of refraction of said containment medium means to minimize refraction and scattering of light and an extraordinary index of refraction in the absence of such prescribed input that is different from the index of refraction of said containment medium means to cause refraction and scattering of light.

4. The display apparatus of claim 3, further comprising input means for applying such prescribed input to said liquid crystal means.

5. The display apparatus of claim 4, said input means comprising electrode means at the opposite surfaces of each of said first and second liquid crystal means for applying an electric field across said first and second liquid crystal means.

6. The display apparatus of claim 5, further comprising circuit means for providing electric energy to said electrode means to effect application of an electric field to said first and second liquid crystal means.

7. The display apparatus of claim 1, wherein said dye is a pleochroic dye.

8. The display apparatus of claim 7, wherein the structure of said pleochroic dye is operative to absorb light when said liquid crystal material is in distorted alignment.

9. The display apparatus of claim 8, further comprising means for applying an electric field to said liquid crystal means to tend to effect generally parallel alignment of said liquid crystal material to reduce the amount of absorption by said dye.

10. A display apparatus comprising:
    a first liquid crystal means disposed at a viewing side of the apparatus;
    a second liquid crystal means spaced from said first liquid crystal means;
    said first and second liquid crystal means comprising high birefringence operationally nematic liquid crystal containing a pleochroic dye and a containment medium means for containing plural volumes of the liquid crystal and dye, said containment medium means having surface means for distorting the natural structure of the liquid crystal to cause the dye to increase light absorption, and the liquid crystal being responsive to a prescribed input to reduce the amount of such light absorption;
    transflector means partially reflective and partially transmissive for transmitting and reflecting light incident thereon, said transflector means disposed between said first and second liquid crystal means; and
    a source of backlight disposed at a non-viewing side of the apparatus.

11. The apparatus of claim 10 wherein said source of backlight is a source of fluorescent light.

12. The apparatus of claim 10 wherein said transflector means functions as a gain reflector.

13. The apparatus of claim 10 wherein said transflector means reflects about 80% of the light incident thereon from said first liquid crystal means, and transmits about 20% of the light incident thereon from said second liquid crystal means.

14. The apparatus of claim 10, 11 or 13 wherein said transflector means includes a pattern of fluorescent colors.

15. The apparatus of claim 10 further including means for controlling the intensity of the backlight.

16. The apparatus of claim 10 wherein said first and second liquid crystal means each have electrode means formed at their respective opposite surfaces for applying an electric field across said first and second liquid crystal means as the prescribed input, said electrode means comprising a pattern of conductive segments.

17. The apparatus of claim 16, further comprising circuit means for providing electric energy to said electrode means to effect application of the electric field to said first and second liquid crystal means.

18. The apparatus of claim 10 wherein in very low or zero ambient light the apparatus functions as a transmissive display.

19. The apparatus of claim 18 wherein in ambient light of greater than about 1000 foot lamberts the apparatus functions as a reflective display.

20. The apparatus of claim 19 wherein in ambient light between about 100 and 1000 foot lamberts the apparatus functions as a transflective display.

* * * * *

UNITED STATES PATENT AND TRADEMARK OFFICE
CERTIFICATE OF CORRECTION

PATENT NO. : 4,693,560
DATED : September 15, 1987
INVENTOR(S) : Richard Wiley

It is certified that error appears in the above-identified patent and that said Letters Patent are hereby corrected as shown below:

In the specification, Col. 5, line 68, the word "ration" should be --ratio--.

In the specification, Col. 6, line 38, the word "column" should be --columns--.

Signed and Sealed this

Twenty-third Day of August, 1988

Attest:

DONALD J. QUIGG

*Attesting Officer*    *Commissioner of Patents and Trademarks*